April 27, 1926.

A. J. KNAPP

ELEVATING CONVEYER

Filed May 11, 1925     2 Sheets-Sheet 2

1,582,277

Inventor.
Amadee J. Knapp
by Parker & Carter
Attorneys.

Patented Apr. 27, 1926.

1,582,277

UNITED STATES PATENT OFFICE.

AMADEE JOHN KNAPP, OF LA PORTE, INDIANA, ASSIGNOR TO ADVANCE-RUMELY COMPANY, OF LA PORTE, INDIANA, A CORPORATION OF INDIANA.

ELEVATING CONVEYER.

Application filed May 11, 1925. Serial No. 29,326.

*To all whom it may concern:*

Be it known that I, AMADEE JOHN KNAPP, a citizen of the United States, residing at La Porte, in the county of La Porte and State of Indiana, have invented a certain new and useful Improvement in Elevating Conveyers, of which the following is a specification.

This invention relates to a conveyer attachment used in connection with an elevator and a swinging conveyer with a hopper. It is illustrated herewith in connection with the grain handling and weighing attachment of a separator or threshing machine. It has for one object to provide a hopper attachment which will receive grain from a weigher and convey it to an elevating conveyer so that the flow of the grain will be even and satisfactory at whatever elevation the conveyer may be set.

Another object is to provide a cover for such hopper so that grain will not be spilled from the hopper even when the conveyer is raised to a steep angle.

A further object is to provide an adjustable bottom for the hopper so that a sharply inclined path is always provided for the grain from the weighing discharge attachment to the conveyer. Other objects will appear from time to time throughout the specification and claims.

My invention is illustrated more or less diagrammatically in the accompanying drawings, wherein—

Figure 4 is a vertical cross section taken on line 4—4 of Fig. 2.

Like parts are designated by like characters throughout.

Figure 1:
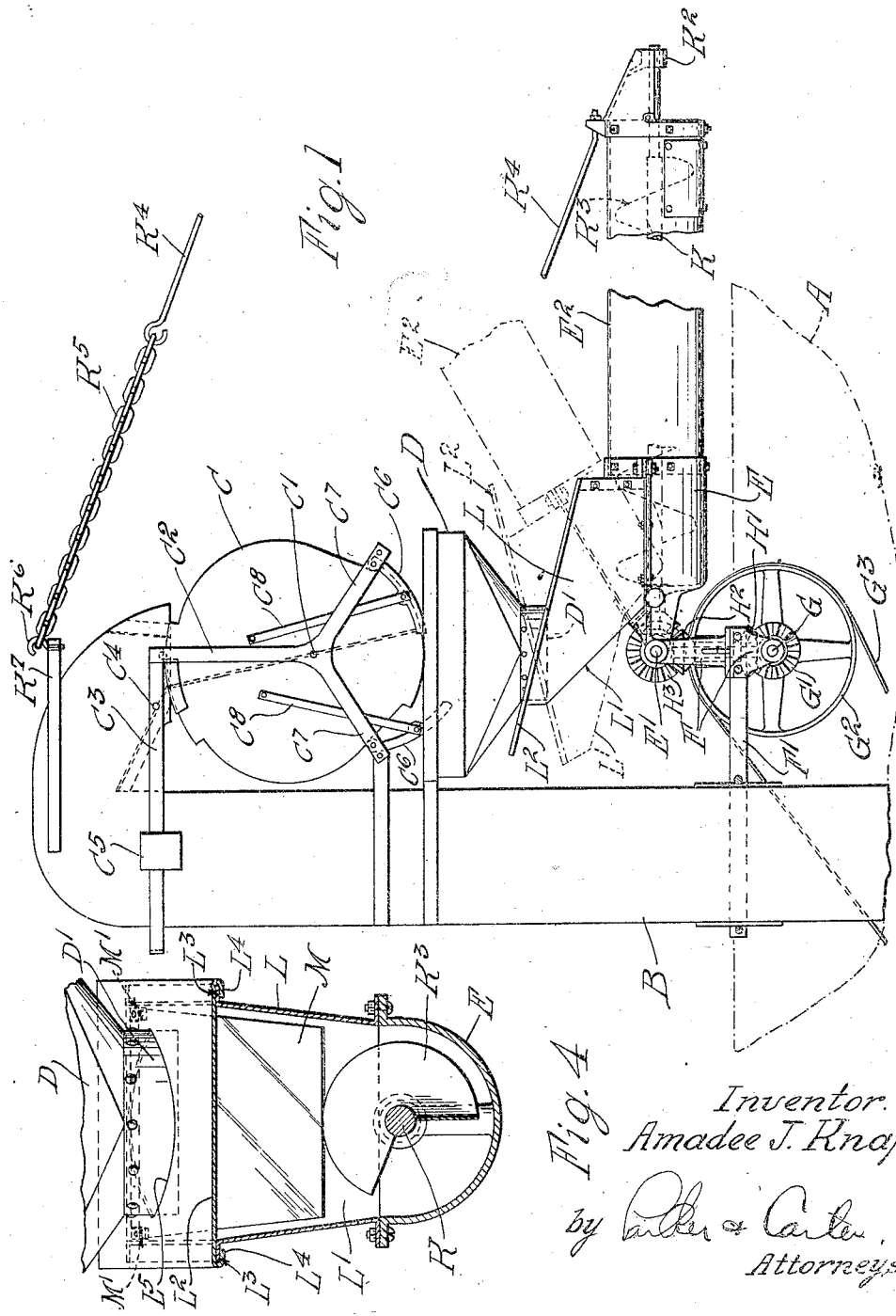
Figure 1 is a side elevation with part broken away showing the conveyer attachment in position in a grain handling assembly which is itself mounted upon a separator.
Figure 2:
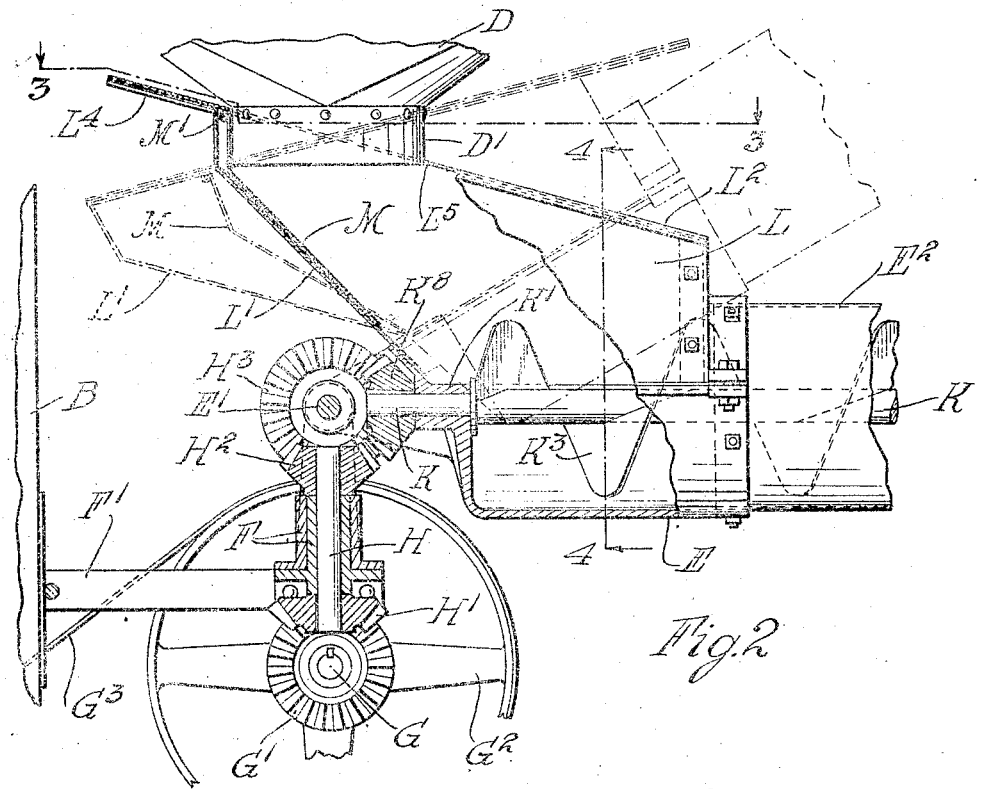
Figure 2 is a detailed longitudinal cross section on an enlarged scale with some parts in elevation, showing particularly the hopper attachment.
Figure 3:
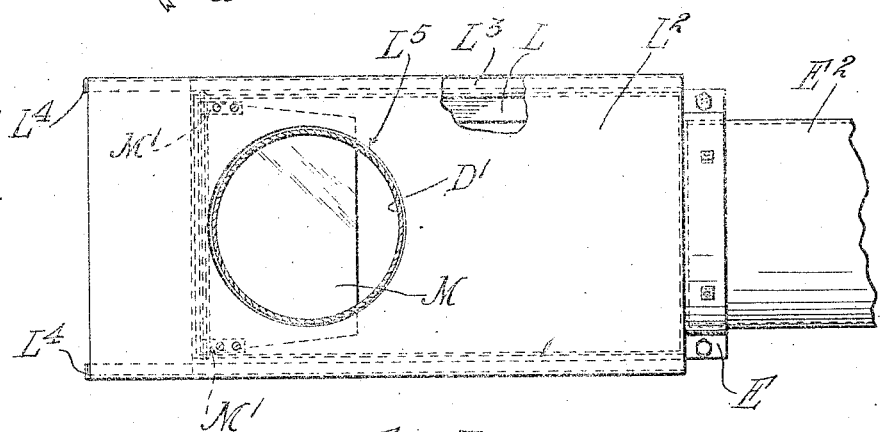
Figure 3 is a horizontal cross section taken on line 3—3 of Fig. 2 and showing the hopper cover in plan, with parts broken away.

A is the side of a separator. B is the enclosure for a conveyer by means of which grain or other material which has been through the separator is conveyed upward from its point of discharge to any suitable weighing attachment. As here shown, the weighing attachment is a well known type, including the two-compartment receiving bucket C, which is pivotally supported at $C^1$ in a cradle or frame $C^2$ which is itself suspended from a scale beam $C^3$, pivoted at $C^4$ and provided with an adjustable weight $C^5$, $C^6$, $C^6$ are doors, each pivotally mounted at one edge on arms $C^7$ of the frame work $C^2$ and each provided preferably at each end with pivoted closing arms $C^8$. The details of this weighing attachment form no part of the present invention.

D is a receiving hopper into which grain from the weigher falls. It is provided with a generally cylindrical outlet $D^1$. E is the head portion of a screw conveyer casing $E^2$. It is pivotally mounted at $E^1$ on a bracket F carried on a support $F^1$ which extends outward from the first mentioned casing B. Supported also on the member F is a shaft G having upon it a bevel gear $G^1$ and a driving pulley $G^2$ which is driven by a belt $G^3$ from any suitable source of power.

H is a shaft supported from the member F and carrying at its lower end a bevel gear $H^1$ meshing with the gear $G^1$ and having at its upper end the bevel gear $H^2$ meshing with a bevel gear $H^3$ which is supported upon a shaft $E^1$ carried by the bracket F.

K is the screw conveyer shaft. It is supported at one end in the bearing $K^1$ in the casing E and at its other end in the bearing $K^2$ which is supported at the outer end of the main screw conveyer casing $E^2$. About the shaft K is a helical conveyer $K^3$. The outer end of the screw conveyer is adjustably supported by means of a rod $K^4$ and a chain $K^5$ which engages a hook $K^6$ on a bracket $K^7$. By means of the bevel gear $K^8$ keyed to the shaft K, and meshing with the gear $H^3$ the screw conveyer may be driven no matter what its angle of inclination and it may thus be raised or lowered to discharge into suitable bins without altering its driving connection. The conveyer is adjusted up and down by shortening the chain $K^5$.

Fastened to the casing E and discharging into it, is a hopper L having an inclined bottom $L^1$ and a sliding top $L^2$. The hopper itself is provided with outwardly turned edges $L^3$ which are engaged on their under side by the downwardly turned edges $L^4$ of the cover $L^2$. This cover has a round perforation $L^5$ in it through which the cylindrical portion $D^1$ penetrates.

M is a bottom flapper pivoted to the under side of the cover L² at M¹. When the conveyer is in the horizontal position it lies substantially flat on the bottom L¹ of the hopper.

The use and operation of my invention are as follows:

When the conveyer is to be used, the parts are put in operation. Grain is moved to the weighing attachment, discharged from it into the hopper and moves through the hopper to the screw conveyer and out through it to the final point of discharge. When the parts are in the position shown in full lines, the flapper is inoperative and the grain merely slides down along it into the screw conveyer. When the parts are moved into the dotted line position, the cover which lies about the lower end of the upper hopper slides with relation to the lower hopper and, therefore, that hopper remains covered, in whatever position it occupies. As the cover slides forward the flapper slides with it and when so moved, it always occupies a position of greater inclination than that occupied by the bottom of the lower hopper which has been tilted rearwardly and thus occupies a position of less inclination than usual. Thus, by means of the cover and flapper construction the lower grain hopper is always covered, grain cannot be spilled from it and a sufficiently inclined bottom is always provided so that the movement of the grain is not interfered with but it always moves rapidly across either the inclined bottom of the lower hopper or across the inclined flapper and, therefore, spilling from the lower hopper is prevented, irrespective of its tilting and an adequately inclined bottom to cause rapid movement of the grain through it is constantly provided.

I claim:

1. In combination a fixed and a movable hopper one mounted to discharge into the other each having an outlet and means for keeping the movable hopper covered irrespective of its movement, said means including a cover for said hopper mounted thereon for movement relative thereto, said movable hopper adapted to be tilted with relation to said first hopper.

2. In combination a fixed and a movable hopper one mounted to discharge into the other each having an outlet and means for keeping the movable hopper covered irrespective of its movement, said means including a cover movable with relation to the movable hopper in response to its movement.

3. In combination a fixed and a movable hopper one mounted to discharge into the other each having an outlet and means for keeping the movable hopper covered irrespective of its movement, said means including a cover movable with relation to the movable hopper in response to its movement, said cover engaging a portion of said fixed hopper.

4. In combination a fixed and a movable hopper one mounted to discharge into the other each having an outlet and means for keeping the movable hopper covered irrespective of its movement, said means including a slidable cover slidably mounted on said movable hopper and engaging said fixed hopper.

5. In combination a fixed and a movable hopper one mounted to discharge into the other each having an outlet and means for keeping the movable hopper covered irrespective of its movement, said means including a perforated, slidable cover slidably mounted on said movable hopper and engaging the outlet portion of said fixed hopper.

6. In combination a fixed and a movable hopper each having an outlet and means for keeping the movable hopper covered irrespective of its movement and means for furnishing an inclined path between the fixed hopper and the outlet of the movable hopper at all times, said movable hopper adapted to be tilted with relation to said first hopper.

7. In combination a fixed and a movable hopper each having an outlet and means for keeping the movable hopper covered irrespective of its movement, said means including a cover movable with relation to the movable hopper in response to its movement, said cover engaging a portion of said fixed hopper, and means for furnishing an inclined path between the fixed hopper and the outlet of the movable hopper at all times.

8. In combination a fixed and a movable hopper each having an outlet and means for keeping the movable hopper covered irrespective of its movement, said means including a perforated, slidable cover slidably mounted on said movable hopper and engaging the outlet portion of said fixed hopper, and means for furnishing an inclined path between the fixed hopper and the outlet of the movable hopper at all times.

9. In combination a fixed and a movable hopper each having an outlet and means for keeping the movable hopper covered irrespective of its movement and means for furnishing an inclined path between the fixed hopper and the outlet of the movable hopper at all times said means including a pivoted member mounted for movement relative to said movable hopper.

10. In combination a fixed and a movable hopper each having an outlet and means for keeping the movable hopper covered irrespective of its movement, said means including a cover movable with relation to the movable hopper in response to its movement, said cover engaging a portion of said fixed hopper, and means for furnishing an inclined path between the fixed hopper and the outlet of the movable hopper at all times, said means including a pivoted member mounted for movement relative to said movable hopper.

11. In combination a fixed and a movable hopper each having an outlet and means for keeping the movable hopper covered irrespective of its movement, said means including a perforated, slidable cover slidably mounted on said movable hopper and engaging the outlet portion of said fixed hopper, and means for furnishing an inclined path between the fixed hopper and the outlet of the movable hopper at all times, said means including a pivoted member mounted for movement relative to said movable hopper.

12. In combination a fixed hopper and a movable hopper, the fixed hopper arranged to discharge into the movable hopper, a cover slidably mounted on the moving hopper engaging the fixed hopper and adapted when the hoppers are relatively moved, to slide with relation to the movable hopper to keep it covered at all positions.

13. In combination a fixed hopper and a movable hopper, the fixed hopper arranged to discharge into the movable hopper, the movable hopper mounted upon a conveyer, a cover slidably mounted on the moving hopper engaging the fixed hopper and adapted when the hoppers are relatively moved, to slide with relation to the movable hopper to keep it covered at all positions.

14. In combination a fixed hopper and a movable hopper, the fixed hopper arranged to discharge into the movable hopper, the movable hopper mounted upon a conveyer, a cover slidably mounted on the moving hopper engaging the fixed hopper and adapted when the hoppers are relatively moved, to slide with relation to the movable hopper to keep it covered at all positions, the cover having a swinging flap mounted upon it hanging within the movable hopper and adapted irrespective of the position of the movable hopper to furnish an incline between the fixed hopper and the conveyer.

15. In a grain handling apparatus a movable conveyer and a receiving hopper mounted on said conveyer in combination with an intermediate hopper mounted above said first mentioned hopper, said intermediate hopper provided with a downwardly extending cylindrical discharge, said first mentioned hopper having a slidable cover mounted thereon and engaging the discharge of said intermediate hopper and adapted when the first hopper is moved to slide upon it, said first hopper having an inclined bottom and said cover having a pivoted, inclined flap within such first hopper, said flap adapted to furnish at all times an inclined path from said intermediate hopper to said conveyer.

16. In combination, a conveyer having a hopper fixed upon it, the conveyer adapted to move, and a second hopper adapted to discharge into the first hopper and a cover slidably mounted on said first hopper and engaging said second hopper, whereby the cover moves with relation to said first hopper as the latter is moved but tilts only with relation to said second hopper during such movement, said cover being provided with a downwardly depending flap lying within said first hopper which supplies, at all positions, an inclined path from said second hopper to said conveyer.

Signed at La Porte, county of La Porte, and State of Indiana, this 6th day of May, 1925.

AMADEE JOHN KNAPP.